United States Patent [19]
Bloodgood

[11] 4,220,410
[45] Sep. 2, 1980

[54] APPARATUS AND METHOD FOR PRODUCING AN ENLARGEMENT OF A GRAPHIC IMAGE

[76] Inventor: David L. Bloodgood, 26 W. Micheltorena St., Santa Barbara, Calif. 93101

[21] Appl. No.: 3,717

[22] Filed: Jan. 15, 1979

[51] Int. Cl.² .............................................. G03B 27/52
[52] U.S. Cl. ........................................ 355/18; 355/63; 355/72; 355/74
[58] Field of Search ...................... 355/18, 21, 27, 39, 355/46, 63, 72, 74

[56] References Cited

U.S. PATENT DOCUMENTS

| | | | |
|---|---|---|---|
| 450,475 | 4/1891 | Quartley | 355/63 |
| 1,527,883 | 2/1925 | Lare et al. | 355/63 X |
| 1,994,091 | 3/1935 | Schwartz | 355/63 X |
| 2,484,048 | 10/1949 | Powers et al. | 355/18 X |
| 3,322,029 | 5/1967 | Palmquist et al. | 355/72 X |
| 3,540,807 | 11/1970 | Minikes | 355/74 X |

Primary Examiner—Richard A. Wintercorn
Attorney, Agent, or Firm—Daniel J. Meaney, Jr.

[57] ABSTRACT

An apparatus for producing an enlargement of a graphic image having a light tight housing with an opening on one side of the housing which cooperates with a light tight door to provide access to a central area of the housing, a platen adapted to receive a graphic image to be enlarged at the bottom of the housing, at least one set of parallel space lens support slots fixed to the housing and positioned one slot on each side of the hollowed out area and located a preselected distance from the platen, at least one set of parallel space slots fixed to the housing and positioned one slot on each side of the housing at the upper end of the housing with the parallel space and support slots and the platen located thereunder, a planar lens support having a fixed focal length lens adapted to be slidably inserted into and supported by at least one set of lens supports to position the lens between the platen and the base support slots, a planar matt support of a selected dimension positioning a sensitized sheet material which is responsive to actinic radiation with the sensitized surface adjacent the lens to receive an enlarged developable graphic image on the sensitized surface is shown.

8 Claims, 12 Drawing Figures

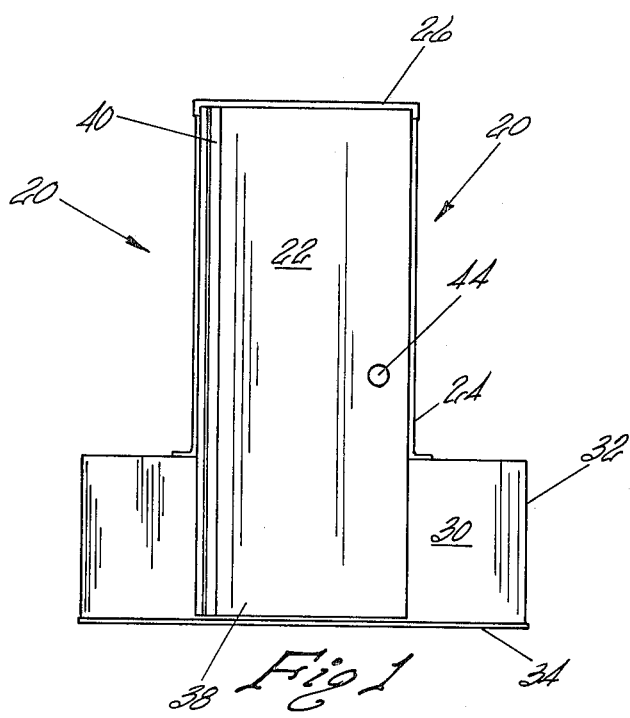
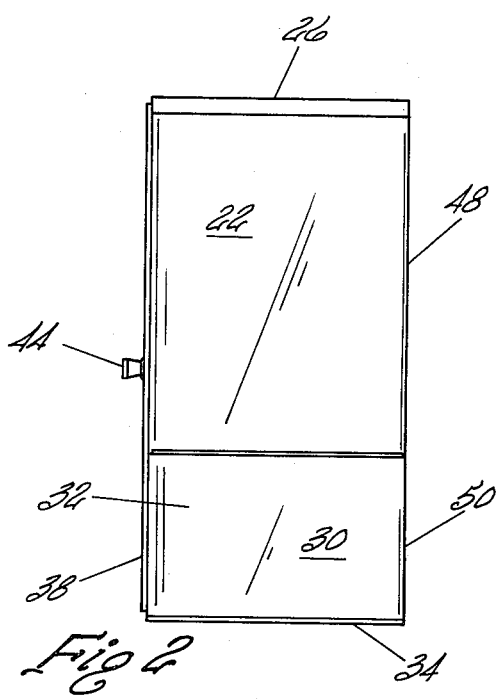
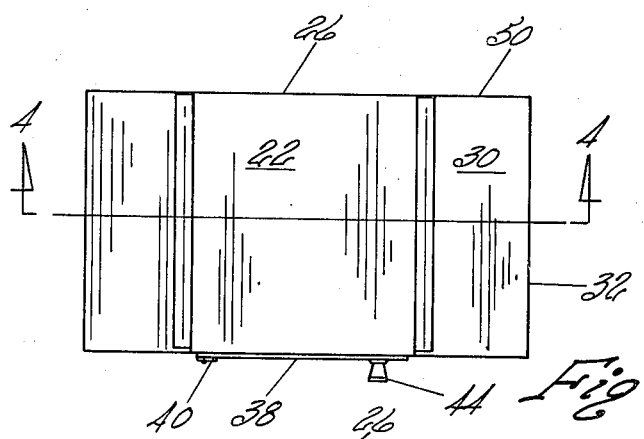
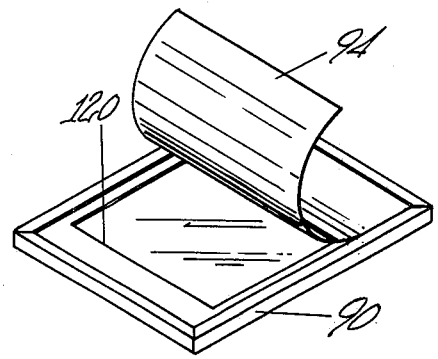
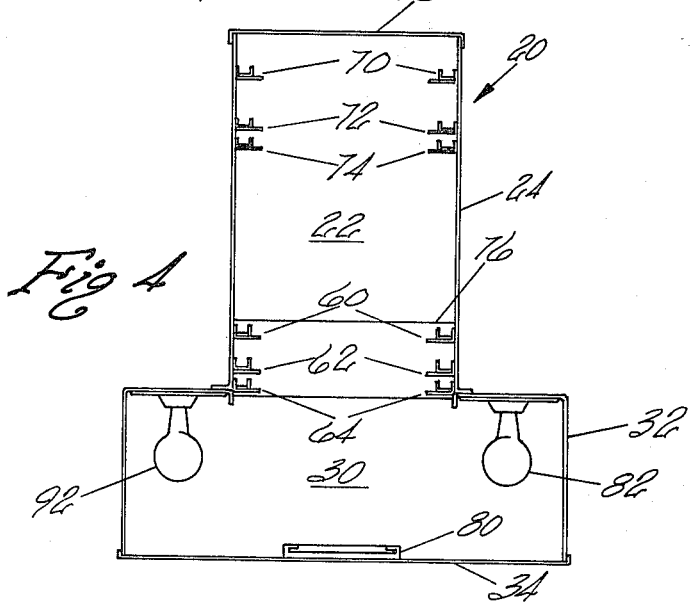
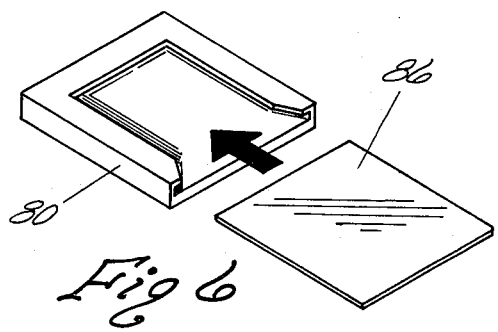

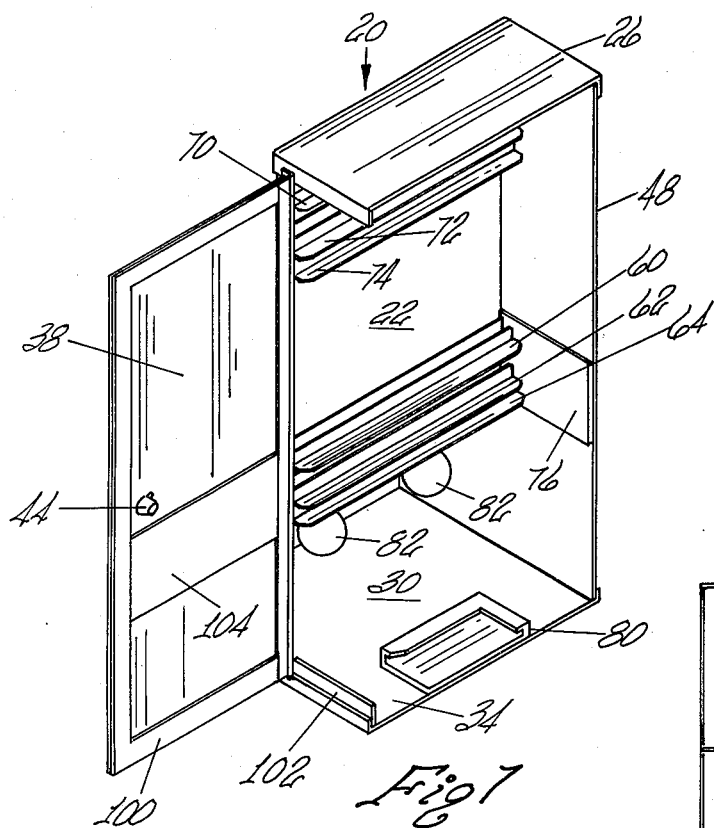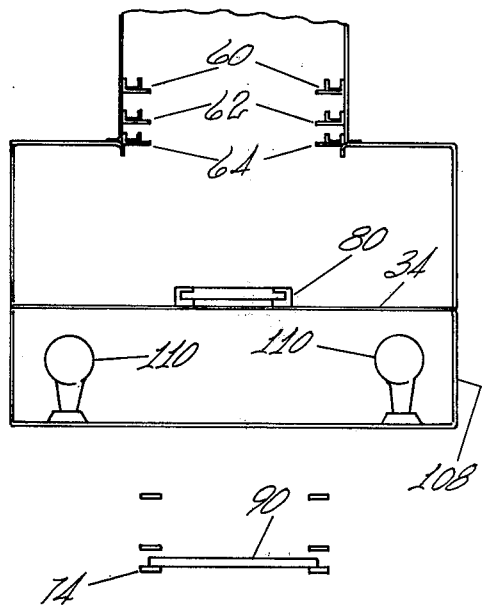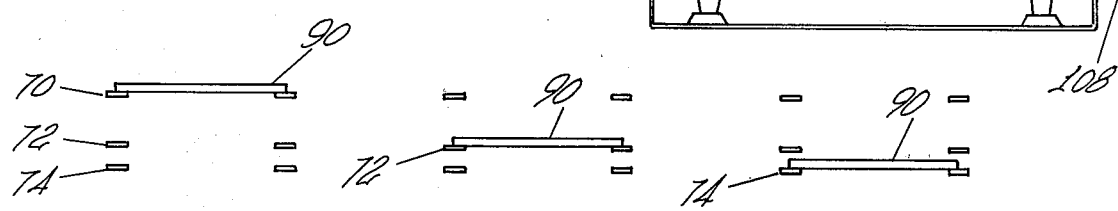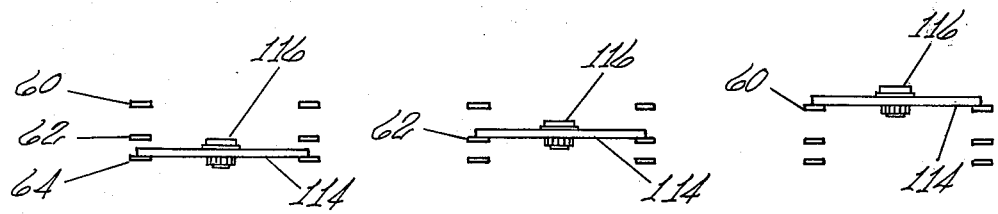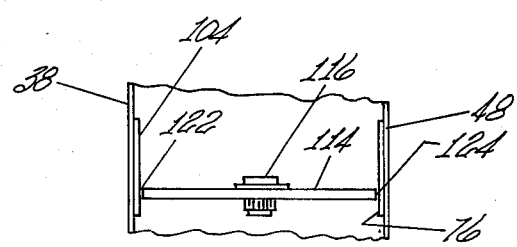

APPARATUS AND METHOD FOR PRODUCING AN ENLARGEMENT OF A GRAPHIC IMAGE

BACKGROUND OF THE INVENTION

1. Field of the Invention

This invention relates to an improved apparatus for producing a graphic image wherein a light tight housing having a door thereon provides access to a movable lens support and a movable matt platen support for making a predetermined enlargement of a graphic image. This size of the enlargement is determined by the position of a planar lens support having a fixed focal lens and the position of a planar matt support which positions a sensitized sheet of photographic material towards the lens. More particularly, this invention relates to a simple, novel and unique apparatus adapted to produce enlargements of a graphical image wherein the enlargement is one of several selected preset fixed ratios which can be selected and determined by the position of a fixed focal length lens relative to the graphic image and the position of a planar matt support having a sensitized piece of photographic paper relative to the lens. This invention has application for use in a diffusion transfer photographic process wherein an exposed sensitized sheet of material can be developed or processed by use of a diffusion transfer technique to produce a developed enlarged graphic image.

2. Disclosure of the Prior Art

It is known in the art to utilize enlarging apparatus and equipment for producing an enlargement of a graphical image. Typically, a graphical image in the form of a negative is positioned into an enlargement apparatus wherein the negative is back illuminated to produce an enlarged graphic image on an easel. By adjustment of the entire head of an enlarger relative to the easel and adjustment of the lens, an enlarged graphical image of the back illuminated negative is produced. A sheet of sensitized photographic material which is generally responsive to the wave length of the light used to back illuminate the negative, produces an exposed developable image. Typically, the exposed image is then developed by use of chemicals in a normal manner to produce the enlarged print.

It is also known in the art to immediately develop exposed images on a sensitized sheet of photographic material without the need of wet chemical processing. Typical of such processes is the development process used by the Polaroid Corporation and Kodak Corporation for producing photographic prints, within a minute or so after exposure, of the photographic material by an image.

It is also known in the art to utilize contact printing devices for producing a direct one-to-one print of a negative. Typically, contact prints are made by placing a negative adjacent a sensitized sheet of photographic material. A light source back lights the negative with actinic radiation to expose the sensitized sheet of material in contact with the negative. The sensitized photographic sheet of material is exposed by the actinic radiation for a predetermined period of time to produce the latent image on the sensitized sheet. Thereafter, the exposed sheet is developed using normal wet chemical developing techniques to produce a contact print of the negative.

In certain commercial operations, such as producing antique type, old time photographic prints, it is desirable to produce an enlargement of a print which was taken and produced on an instant printing type of film such as a polariod type camera. Typically, in the old time, antique photographic business, a subject dresses in an old time costume and has a picture taken in a selected background and setting. The pictures are normally taken by use of a known commercial view camera such as Nagoka 4"×5" view camera and a known commercial instant film holder such as Polariod Model 545 Film Back. After the print is developed, it is sometimes desirable to produce one or more copies of the print. The print copy may either be a one-to-one size print or an enlargement of the print.

Typically, additional time is usually required for an operator to produce an enlarged copy of the type print taken of a subject using expensive apparatus.

One problem which has been encountered in producing one or more copies of an old time photo print, either in the same size or an enlarged size, is that the copies must be made while the customer is writing. Also, the prints are typically required to be made in a special light controlled environment. Thus, the prior art is devoid of a simple, preset apparatus for producing an enlargement of a graphic image which is easy to operate, which can be utilized on location for producing one or more prints of a same or selected enlargement relative to an original print and which can be operated in an ambient light environment.

SUMMARY OF THE INVENTION

It is an object of this invention to produce a novel, unique and improved apparatus for producing an enlargement of a graphic image located in a platen by adjusting the location and position of a planar lens support and a planar matt support having a sensitized sheet to produce an enlargement of a graphic image of a selected size.

Yet another advantage of the present invention is that an enlargement of a graphic image can be easily and quickly produced in a selected enlargement size by use of a sensitized photographic sheet material which is responsive to an actinic radiation of a selected wave length and which can be developed by use of a diffusion transfer process.

Yet another advantage of the present invention is that the apparatus for producing an enlargement of a graphic image can be used in producing fast, commercially acceptable prints of a graphic image for use in a variety of businesses including old time photographic antique type pictures.

A further advantage of the present invention is that the apparatus for producing enlargement has wide application for producing an enlargement of graphic images of both pictorial and text material and can produce the same quickly in a standard office or store environment.

It is still a further object of this invention to provide a novel and unique apparatus which is easy to use and can be used with minimum training by an employee for producing high quality, commercially acceptable copies or enlargements of images.

This invention together with its further objects and advantages is best understood with reference to the accompanying specification taken together with the accompanying drawings and descriptions of the preferred embodiment as described herein.

BRIEF DESCRIPTION OF THE DRAWINGS

FIG. 1 is a front plan view of the apparatus of the present invention;

FIG. 2 is an end plan view of the apparatus incorporating the teachings of this invention;

FIG. 3 is a top plan view of the apparatus shown in FIG. 1;

FIG. 4 is a cross-section of the apparatus of the present invention taken along section lines 4—4 of FIG. 3;

FIG. 5 is a planar matt support adapted to be inserted into the apparatus of FIG. 1;

FIG. 6 is a platen adapted to receive and position a graphic image in the apparatus of FIG. 1;

FIG. 7 is a pictorial representation partially in cross-section showing the parallel spaced lens support slots, parallel spaced support slots and platen;

FIG. 8 is a partial end view shown in cross-section with the source of actinic radiation positioned adjacent the figure image to transport actinic radiation therethrough;

FIGS. 9a, 9b and 9c are pictorial representations of the various positions of a planar matt support, a planar lens support and the platen for obtaining various preselected sizes of enlargement; and FIG. 10 is a partially cross-sectional view of the sealing relationship between the metal lens support and the walls of the housing.

DESCRIPTION OF THE PREFERRED EMBODIMENT

FIG. 1 illustrates a light tight housing, generally shown as 20, which has an extended hollowed out central area which is defined by an upper section 22 which is defined by a first section side wall 24 and a top 26. The housing 20 also has a lower section 30 having lower section side walls 32 and a bottom 34. The housing 20 has at least one opening from the exterior of the housing into the hollowed out central area. In the embodiment of FIG. 1, the housing 20 has a door 38 which is pivotally mounted by an elongated hinge 40 which supports and permits the door 38 to be opened and closed to provide access to the central area of the housing 20. A door latch 44 is provided to fasten the door in a closed position to make the central area within the housing light tight.

FIG. 2 shows an end view of the same elements of the housing as shown in FIG. 1 with the upper section 22 having a back wall 48. The lower section 30 has a lower section back wall shown as wall 50.

FIG. 3 shows the relationship between the upper section 22 and the bottom section 30. The door 38 is shown in a closed position with the hinge 40 located on the left side thereof. The door latch 44 is shown to be readily accessible to a user to afford easy opening and closing of the door. The opening and closing of the door access to both the upper section 22 and lower section 30 of the housing 20.

The cross-sectional view of FIG. 4 shows in greater detail the construction of the housing assembly in the housing interior. In the embodiment of FIG. 4, the upper section 22 has located at the lower end thereof a plurality of sets of parallel spaced lens support slots, generally shown as elements 60, 62 and 64. Each set of parallel spaced lens support slots 60, 62 and 64 are affixed to the housing and positioned one on each side of the center axis of the hollowed out area defined by the upper section 22 of the housing. In addition, each set of parallel spaced lens support slots 60, 62 and 64 are positioned a preselected distance from the bottom 34 and the platen 80. Platen 80 is adapted to receive and position a graphic image to be enlarged at a predetermined location along the center axis of, and at one end of, the centered hollowed out area defined between the upper section 22 and the lower section 30 of housing 20.

Upper section 22 of housing 20 includes a plurality of sets of parallel spaced support slots 70, 72 and 74. Each set of the parallel spaced support slots 70, 72 and 74 are fixed to the housing and positioned one slot on each side of the center axis of the hollowed out center area defined in the upper section 22 of housing 20 and located at the other end of the hollowed out area within upper section 22. The lens support slots 60, 62 and 64 are positioned between the platen 80 and at least one set of the matt supporting slots 70, 72 and 74.

In the embodiment of FIG. 4, there is a specific distance between each of the parallel aligned spaced lens support slots and each of the parallel aligned spaced planar matt support slots. The spacing is discussed in greater detail in connection with the description of FIGS. 9a, 9b and 9c.

The bottom section 30 of the housing 20 includes means positioned adjacent the platen 80 for controllably illuminating a graphic image which is inserted into platen 80 such as light sources 82.

The upper section 22 of housing 20 has affixed to the back wall 48 a sealing material such as a strip of felt 76.

In the embodiment of FIG. 4, the light sources 82 are positioned relative to the platen for illuminating a graphic image 86 within the platen 80 with actinic radiation at a selected wave length.

FIG. 5 shows a planar matt support 90 which is adapted for receiving and positioning a strip material 94 having a base material with a coated surface thereon. The coated surface is selected to be a material which is responsive to a selected actinic radiation, such as, for example, actinic radiation produced by light source 82.

FIG. 6 depicts the platen 80 which is adapted to receive a graphic image 86 which is adapted to be illuminated from the front.

FIG. 7 illustrates, in a pictorial representation, the relationship between the various components which form the apparatus of the present invention. Specifically, one slot of each set of the parallel spaced support slots 70, 72 and 74 which is adapted to receive and support a planar matt support is shown at one end of the upper section 22. Further, one slot of each set of parallel spaced lens support slots 60, 62 and 64 is depicted at the lower end of the upper section 22 of housing 20. The strip of felt 76, which is a sealing means, is affixed to the upper section back wall 48.

In FIG. 7, the construction of the door 38 is shown in greater detail. Specifically, the door 38 has a peripheral means for sealing, such as, for example, a piece of felt 100, extending around the exterior thereof. Sealing strip 100 is intended to cooperate with lip 102, which forms part of the bottom 34 of the bottom section 30, and the peripheral edge of the housing to form a light tight seal when door 38 is closed. Latch 44 locks the door 38 in a closed position and when the door 38 is in locked position, a slight force is urged against the sealing strip 100 causing a light tight seal around the interior of the housing. A second plate of felt strip 104 is positioned on the door on each side adjacent the hollowed out central area. The location and width of felt strips 76 and 104 are determined by the distance between the lens support slots 60, 62 and 64 within the housing 20.

FIG. 8 shows yet another embodiment of the apparatus of the present invention. In the embodiment of FIG. 8, the platen 80 supports a graphic image which is adapted to be back lighted. An illumination section 108 is attached to the bottom 34 and incorporates actinic radiation means, such as, light source 110. Actinic radiation produced by light source 110 passes through a graphic image held in the planar matt support to back light the graphic image. Typically, in this embodiment, the graphic image is a negative. The lens support slots 60, 62 and 64 are illustrated being substantially in the same position as those illustrated in FIG. 7.

Before getting into the detail as to how the apparatus for producing an enlargement of a graphic image is utilized, a brief description will now be given as to the method for using the apparatus.

A sheet material 94 having a sensitized surface is used as the material which is to have an enlarged graphic image formed thereon by actinic radiation. The image formed on the strip material 94 is subsequently developed. A method for making the image is generally characterized as a diffusion transfer process.

A positive graphic image is inserted into the platen 80. If a positive picture is used, the actinic radiation illuminates the graphic image in the form shown in FIGS. 4 and 7. However, if the graphic image is a transparency (black/white or color), it is desirable to back light the graphic image using the technique illustrated in FIG. 8. In the preferred embodiment, the graphic image inserted into the platen 80 is a print having a dimension of 4 inches×5 inches. In use, it is envisioned that any size graphic image may be used ranging from a 35 millimeter transparency up to a 5×7 inch, or larger, positive print.

In the preferred embodiment illustrated in FIGS. 4 and 7, using a graphic image of 4 inches×5 inches, the three sizes that can be produced are as follows:

1. 3½ inch×5 inch;
2. 5 inch×7 inch; and
3. 8 inch×10 inch.

The strip material 94 is generally formed of a base material having a photo responsive coating on the surface thereof. The material generally used is classified as a paper negative. In the preferred embodiment, the paper negative is AGFA copy proof type CPTN. For purposes of an explanation, the diffusion transfer can be characterized as follows. A paper negative strip material, such as the AGFA copy proof type CPTN paper, is exposed with actinic radiation using the apparatus described in FIGS. 1-8 of the present invention. Once the paper negative material has been exposed, it is placed in motion side down against the carrier sheet, such as AGFA type CPP. The assembled carrier sheet and exposed paper negative strip material is processed through a small processor, such as an AGFA type CP 37 processor, sometimes referred to as a Diplomat Processor. A chemical reaction occurs between the paper negative and carrier sheet when the same are compressed together through a set of compression rollers and the image is developed by the diffusion transfer processor. The paper negative sheet and the carrier sheet are held together for about thirty seconds to about 90 seconds, depending upon the exposure time desired. At the completion of the exposure time, the 2 sheets are then peeled apart. During the developing period, exposed silver is transferred from the paper negative to the carrier sheet. The result at the end of the diffusion transfer process is a finished, relatively dry positive print. The print may then be placed into a photo mount or frame and presented to a customer.

The diffusion transfer technology has utility and application in the commercial photography business such as commercial antique old time photos and in character portrait studio operations.

Other variable factors which one can control are the type of light source, the color of the light source and the like. It is envisioned that a color diffusion transfer process can be used to produce a color print rather than a black and white print. In a color application, it is possible to control the wave length of the actinic radiation and the temperature of the light. Further, for precise control, the light source can be a controlled light source having a certain wave length and temperature and can be pulsed such as a flash unit rather than a continuous lighting. In addition, color correction can be obtained through use of a number of filters such as, for example, a Kodak-type CC filter. The filter is positioned on the lens in the lens support 90.

A typical flash which could be used for color printing is a Noman type 202 flash. This would have utility in the so-called back lighting mode as illustrated in FIG. 8.

Referring now to FIGS. 9a, 9b and 9c, a brief description will be made as to how to utilize the apparatus for producing an enlargement of a graphic image. The process of producing an enlargement of a graphic image using the apparatus would include the steps of placing a paper negative material into a matt support with the coated surface or emulsion surface facing toward the graphic image, inserting the matt support into an appropriate one of the sets of matt support slots within the upper section housing 22, inserting the lens support slot with the lens into the appropriate section of the housing in one of the slots 60, 62 or 64 and then placing the graphic image to be enlarged into the platen 80. The door is then closed, forming a light-tight seal within the interior of the housing 20. The source of actinic radiation is then activated for a predetermined period of time to expose the emulsion or sensitized surface of the paper negative material. At the end of the exposure time, the paper material is removed and then processed using the diffusion transfer process such as that as described herein. In a typical operation, exposure times for each of the preselected sizes of prints may be determined by experimentation. However, the following exposures to time were found to be acceptable:

| Size | Exposure Time |
| --- | --- |
| 3½ × 5 | 4 seconds |
| 5 × 7 | 7 seconds |
| 8 × 10 | 10 seconds |

Since the print sizes vary depending upon the size of the enlargement desired, the platen mask 90 would have the appropriate size opening in the mask to accommodate the desired enlargement size. In FIG. 5, the opening of the mask is determined by opening 120.

Referring now to FIGS. 9a, 9b and 9c, the example set forth therein is based on a 4 inch×5 inch positive print being positioned in the platen 80 of FIG. 6. The positive print is shown by graphic image 86 in FIG. 9a. FIG. 9a shows the relationship between the lens support 114 and the lens 116 and the mask support 90 for producing an 8×10 inch enlargement of the 4×5 inch print. Specifically, lens support 114 having a lens 116 is positioned into slot 64. An 8×10 inch mask 90 is positioned into matt support slot 70. The actinic radiation is then activated illuminating the graphic image 86 which is focused by lens 116 onto the surface of the emulsion or sensitized surface of the paper negative held in carrier 90.

FIG. 9b illustrates the setup for producing a 5×7 inch enlargement. Thus, support 90 would use a 5×7 inch mask and is positioned into the matt support slots 72. The lens support with the lens is positioned to lens support slot 62.

FIG. 9c shows the arrangement for producing a 3½×5 inch enlargement or a 4×5 inch copy of the print. The mask 90 would have a 3½×5 inch opening and the matt support is positioned into support slot 74. A lens support with the lens 116 is positioned in lens support slot 60.

Generally, FIGS. 9a, 9b and 9c depict various arrangements for producing various size images or enlargements. If an enlargement greater than 8×10 inches is desired, generally it is merely a question of positioning a lens support 114 with a selected focal length lens 116 in the appropriate position relative to graphic image 86 and positioning the paper negative material at a predetermined distance from the lens support 114 to focus the image of the desired size onto the matt.

In the apparatus illustrated in FIGS. 1 through 8, a light tight seal is important. Therefore, in order to insure a light tight seal between the graphic image and the area containing the paper negative material to be exposed, the lens support 114 supports the lens 116 as the edges thereof push into engaging contact with the felt members 76 and 104 located on the back wall 48 and back of door 38 respectively. Thus, where latch 44 of the door is positioned in the latch position, a slight force is urged by the door 38 against the felt 104 which seals the edge 122 of the lens support 144 which urges the lens support opposite edge 124 into a light tight seal engagement with felt 76 urging the same against the back wall 48.

In the preferred embodiment, the lens utilized in practicing this invention is a fixed local length lens characterized as a 135 mm 4.5 focal length lens.

Variations for using the teachings of this invention are possible. For example, rather than using a planar matt support device 90 having a paper negative thereon as the method for holding the paper carrier, it is possible to have a fixed size enlargement by positioning the planar matt support device at the location of top 26. Thus, to produce an enlargement of a graphic image, the device would operate as a combination camera and enlargement device to produce an exposed paper negative material which can be removed and subsequently developed.

It is anticipated that the apparatus for producing an enlargement of a graphic image can be reduced to a relatively simple device adapted for use as a toy or inexpensive reproducing device easily used in the home or in industry. In the alternative, the apparatus for producing an enlargement of a graphic image can be a relatively sophisticated device naming a plurality of slots to support both the lens support and the planar matt support to produce a wide variation or wide variety of enlargements from a given graphic image. Also, there is wide flexibility as to whether to front light or back light the image with actinic radiation. Color transparencies may be used and color prints may be used by using known diffusion transfer processes. In commercial applications, the apparatus for producing an enlargement of a graphic image can be used in producing antique type old time photographs in a real time basis. In substance, it is possible for a customer in a costume to have an old time picture taken by a photographer using a polaroid camera arrangement. The developed print is then immediately available to the customer. If the customer desires an enlargement or multiple copies of that print, the enlargement of copies can immediately be made by inserting the positive print into the platen 80, positioning the lens support and the matt support at the proper size and with the desired size paper negative into the apparatus for producing the enlargement of the graphic image. In a matter of several minutes, an enlarged photograph or copies of a print can then be delivered to the customer.

What is claimed is:

1. Apparatus for producing an enlargement of a graphic image comprising a light tight housing having an extended hollowed out central area and at least one opening from the exterior of the housing into said hollowed out central area, said housing including a door for providing access to said hollowed out central area and means for covering the edge of said door to make the hollowed out central area light tight;

a platen adapted to receive and position a graphic image to be enlarged at a predetermined location along the center axis of and at one end of said hollowed out area;

a plurality of sets of parallel spaced lens support slots affixed to the housing and positioned one slot of each pair of each side of the center axis of the hollowed out area and located a preselected distance from said platen;

a plurality of sets of parallel spaced support slots equal in number to the plurality of sets of spaced parallel lens support slots affixed to the housing and position one slot on each side of the center axis of the hollowed out central area and located at the other end of the hollowed out area with the lens support slots located between the platen and at least one set of the parallel spaced support slots;

a planar lens support having a fixed focal length lens at the center thereof and adapted to be slidably inserted into and supported by at least one set of lens support slots with the center of the lens positioned in alignment with the predetermined location adapted to receive a said graphic image, said lens having a focal length at least equal to the preselected distance between the lens support slots and the platen;

a planar matt support for receiving and positioning a strip material having a base material with a coated surface thereon, which coated surface is responsive to a selected actinic radiation, said planar matt support being adapted to be slidably inserted into and supported by at least one set of matt support slots for positioning the coated surface toward and in alignment with said lens;

light sealing means affixed to the interior of said door adjacent said plurality of parallel spaced lens support slots and affixed to the interior surface of the housing opposite to the interior of the door, said door when closed in light tight engagement with said housing urging said light sealing means into contact and light sealing engagement with the edge of the planar lens support urging the opposite edge thereof into light sealing engagement with the light sealing means on said housing interior surface forming a light tight seal around the edges of the planar lens support and between said one end and said other end of the hollowed out area; and means positioned adjacent said platen for controllably illuminating a said graphic image with actinic radiation at a selected wave length which is focused by said lens onto the coated surface to produce with said actinic radiation an exposed enlarged graphic image on said coated surface of the graphic image positioned on the predetermined location in the platen.

2. The apparatus of claim 1 wherein said planar lens support is positioned in a selected set of lens support slots and said planar matt support is positioned in a selected set of matt support slots to produce an enlargement which has an enlargement ratio that increases as said planar lens support and said planar matt support are located in sets of lens support slots and sets of matt support slots having a greater distance therebetween.

3. The apparatus of claim 1 wherein said actinic radiation producing means is located between the lens support slots and the platen.

4. The apparatus of claim 1 wherein said actinic radiation means is positioned under the graphic image positioned on said predetermined location adapted to transmit actinic radiation through said graphic image to said lens.

5. The apparatus of claim 1 wherein the light sealing means is a felt material.

6. Enlargement apparatus for producing an enlargement of a graphic image on a coated surface of a base material located comprising a light tight housing having an extended hollowed out central area and at least one opening from the exterior of the housing into said hollowed out central area, said housing including a door for providing access to said hollowed out central area, and means for covering the edge of said door to make the hollowed out central area light tight;

means adapted to position a graphic image to be enlarged at a predetermined location at one end of and within said housing;

means for positioning a fixed focal length lens within said housing a preselected distance from said predermined location, said fixed focal length lens having a focal length which is at least equal to said preselected distance;

means for supporting a base material having a coated surface thereon a predetermined distance from said fixed focal length lens on the side opposite said graphic image at the other end of said housing, said coated surface being responsive to a selected actinic radiation to produce an exposed enlargement of the graphic image located in said predetermined location;

light sealing means affixed to the interior of said door adjacent said plurality of parallel spaced lens support slots and affixed to the interior surface of the housing opposite to the interior of the door, said door when closed in light tight engagement with said housing urging said light sealing means into contact and light sealing engagement with the edge of the planar lens support urging the opposite edge thereof into light sealing engagement with the light sealing means on said housing interior surface forming a light tight seal around the edges of the planar lens support and between said one end and said other end of the hollowed out area; and means positioned adjacent said predetermined location for actinic radiation which illuminates said graphic image and which is directed onto said coated surface by said lens.

7. The method of producing an enlargement of a graphic image using a light tight housing comprising the steps of inserting the graphic image into a platen located in the housing;

placing a planar lens support having a fixed focal length lens into a preselected slot in the housing to position the lens a predetermined distance from the graphic image;

placing a planar matt support having a sheet of material having a sensitized surface into a preselected slot in the housing located on the opposite side of the lens relative to the platen to position the sensitized surface in alignment with and spaced a predetermined distance from the lens;

closing a door having a light sealing material located on the interior surface thereof in the vicinity of the planar lens support urging the light sealing material into light tight sealing engagement with the edge of the planar lens support and urging the other edge of the planar lens support into light tight sealing engagement with light sealing material located on the opposite interior surface of the housing forming light tight chambers at each end of the light tight housing; and controllably illuminating the graphic image with actinic radiation which is received by the lens to expose the sensitized surface to produce a developable latent image of the graphic image.

8. The method of claim 7 further comprising the step of developing the developable latent image with a diffusion transfer process.

* * * * *